Patented May 5, 1931

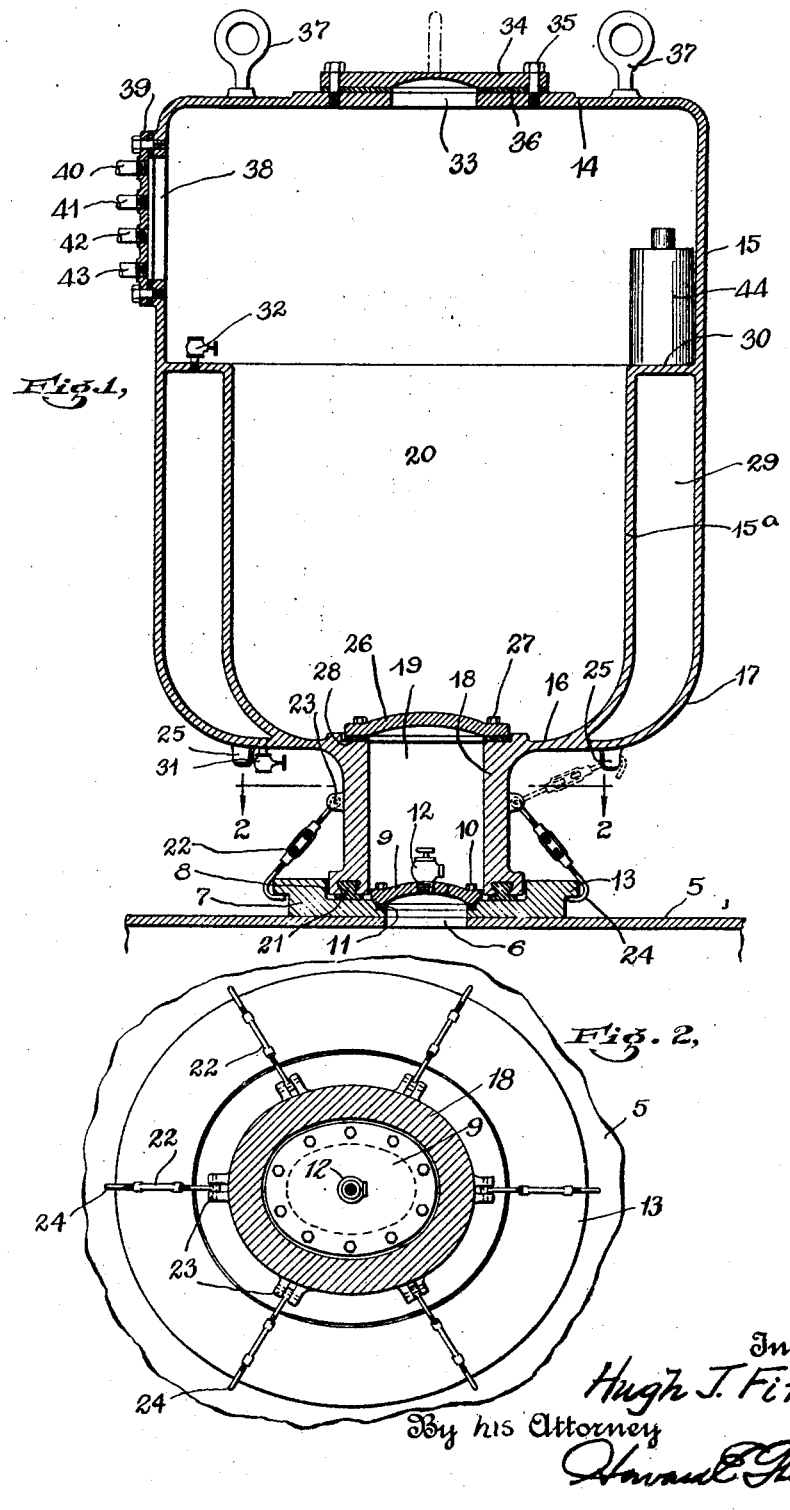

1,803,526

UNITED STATES PATENT OFFICE

HUGH J. FINN, OF BROOKLYN, NEW YORK; ANNA MAY FINN ADMINISTRATRIX OF SAID HUGH J. FINN, DECEASED

SUBMERGIBLE APPARATUS

Application filed May 2, 1928. Serial No. 274,380.

This invention relates to apparatus adapted to be submerged in a body of water and particularly to apparatus of this class designed for use in rescue work, for example in rescuing the members of a crew of a sunken, or disabled and submerged vessel, such for example as a submarine, and including means for coupling the apparatus to the vessel, and to place the room or compartment of said apparatus in communication with one or more rooms or compartments of the submerged vessel, to enable the crew of the vessel to pass from the submerged vessel into said apparatus, for transmission to the surface of the body of water or to the salvaging ship or vessel; and the object of the invention is to provide an apparatus of the class specified which is constructed of sufficient strength to withstand the pressures to which the same may be subjected when submerged in a body of water and to the provision of means for quickly and yet firmly coupling the apparatus to a submerged vessel and for placing the apparatus and vessel in communication, said apparatus being adapted to be coupled with one or more man-hole or access hatches provided on the hull of a vessel; a further object being to provide an apparatus with one or more admission and discharge openings with covers for controlling such openings, the control of the cover of one of said openings being accessible from the interior of the apparatus, and the control of the other cover being external; a further object being to provide the lower end portion of the apparatus with means for admitting water thereto or to an independent tank or chamber constituting part thereof for the purpose of submerging the vessel with valves opening externally and internally of the apparatus to control and regulate the amount of water so admitted; a further object being to provide means for coupling a cable or other lifting and lowering means with the apparatus to facilitate the raising and lowering thereof and to aid in the coupling of the apparatus with the hole of the submerged vessel; a still further object being to provide means whereby necessary elements or devices may be placed in communication with the chamber of the apparatus, such for example, as the supply of air thereto, power, light, telephone connections and the like; and with these and other objects in view, the invention consists in an apparatus of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a diagrammatic, sectional view of an apparatus made according to my invention and illustrating the method of its use; and, Fig. 2 is a section on the line 2—2 of Fig. 1 on an enlarged scale.

My improved apparatus may be used for many purposes in connection with under water construction, but has for its primary object, a use in connection with sunken or otherwise inoperative submerged vessels, such for example as submarines.

In the accompanying drawing, the reference numeral 5 represents a portion of the hull of a submarine of any desired construction. In practice, I prefer to employ one and preferably two or more hatchways or openings 6 in the hull of the vessel, leading to one or independent chambers thereof. In practice, each of the openings 6 employed are provided with enlarged and strong and durable flange body portions 7 having a comparatively large recess 8 opening through the outer end thereof. The opening 6 is adapted to be closed by a cover 9 having screws, bolts or other means 10, exposed externally for removing said cover. The cover 9 seats upon a gasket 11 which forms a water-tight as well as air-tight seal between it and the hull of the vessel, but the flange 7 and the cover 9 is also preferably provided with an externally controllable valve 12. The body 7 has a peripherial flange 13 which is the construction shown, provides means for coupling my improved apparatus in connection therewith.

From the foregoing, it will be understood that the submarine or other submerged vessel will be built or constructed to suit my improved apparatus or may be modified or repaired to adapt the same for such use. It is also preferred that the opening 6 be arranged at different points with reference to the circumferential plane of the submarine, in order to facilitate the gaining of admission to at least one of the rooms or compartments thereof, regardless of the position assumed by the sunken vessel.

My improved apparatus is preferably in the form of a cylindrical and comparatively large tank, which might be termed a life saving booth. This apparatus will be constructed of sufficient strength to withstand the pressures to which it is likely to be subjected, and caring for the worst possible conditions that may be experienced in the use of apparatus of this type for the purposes stated. The top wall 14 of the apparatus is substantially flat in the construction shown, the side walls 15 being cylindrical and joining the bottom wall proper 16 by rounded corner portions 17, permitting the free flow of water by the apparatus in the operation of submerging the same. The bottom wall 16 has a downwardly directed tubular body 18, which may be termed a distance piece, the chamber 19 of which forms a passage placing the chamber 20 of the apparatus in communication with the chamber of the submarine, with which the opening 6 communicates. In the construction shown, the tubular extension 18 is preferably made elliptical in form as is also the flange body 7 and cover 9 and the recess 8 in the flange body. However, my invention is not necessarily limited to this formation.

The lower face of the tubular extension 18 is provided with an annular dove-tailed groove in which is seated a packing gasket 21 to form a seal between the extension 18 and the flange body 7. It is to be noted that the lower end of the extension 18 fits freely within the recess 8, and also serves to guide said extension in the operation of coupling the apparatus with the submerged vessel. The diameter of the chamber 19 is greater than the diameter of the cover 9 so as to permit of the removal of the cover through said passage in the use of the apparatus.

Suitable means is provided for coupling the apparatus in connection with the submarine to securely retain the apparatus in position and to form a seal between the same and the submarine. In the construction shown, this means consists of a plurality of turn buckles 22, pivotally coupled to the exterior of the extension 18 as seen at 23. The free ends 24 of said turn buckles are hook-shaped in form as seen in Fig. 1 of the drawing, and are adapted to engage the projecting flange 13 on the flange body 7. The bottom 16 of the apparatus is preferably provided with projecting spring keepers 25, which are adapted to normally support the turn buckles 22 in a raised and inoperative position, but may be detached from said clips by a diver by exerting downward pressure thereon.

I employ a cover 26 which controls the communication between the chambers 19 and 20. This cover is secured to the bottom wall 16 of the apparatus by screws, or other means 27, a suitable gasket 28 being employed to form a water and air tight connection, and the screws or other securing means are accessible from the chamber 20 of the apparatus for purposes later described.

I also employ means for sinking or submerging the apparatus, and in the construction shown, this is accomplished by providing a supplemental chamber 29 at the lower end portion of the apparatus and formed by supplemental side walls 15a and a top wall 30. An external valve 31 is adapted to place the chamber 29 in communication with the exterior of the apparatus to allow for the inflow of water into the chamber 29. This operation is facilitated and may also be controlled by another valve 32 at the upper end of the chamber 29 and opening into the chamber 20 of the apparatus, the latter valve being controlled from within the apparatus.

I also preferably provide the top wall 14 of the apparatus with an opening or man hole 33 normally closed by a cover 34 having securing means 35 controlled externally of the apparatus, the cover seating on a suitable gasket 36 to fit the desired seal. The top wall is also provided with a plurality of coupling rings or eyes 37, three or four of which may be employed. These rings facilitate the attachment of a cable or other hoisting means therewith to permit of the raising and lowering of the apparatus from an overhead control on a salvaging or other ship or vessel.

I also preferably provide the side wall 15 of the apparatus with an opening 38 which is closed by a suitable cover 39. This cover may in some uses of the apparatus, and when deemed desirable or advisable, include a number of pipes or tubes 40, 41, 42 and 43, each of which may be used for a separate and independent purpose, such for example as the transmission of air for supply to and discharge from the chamber 20, the passage of electric wires for lighting or for telephone connections, power or other purposes and the transmission of liquid foods, should the apparatus be used for an undue length of time when submerged for the purpose of repair to the sunken vessel. In this instant, it may be used as a service apparatus through which one or more workmen may pass from the chamber 20 into and out of the sunken vessel. It will be understood, that my invention is not necessarily limited to the use of the tubes or pipes 40 to 43 inclusive.

In apparatus of the class described, one of the principal and desirable factors resides in the provision of a simple and most economically constructed apparatus of the class under consideration which may be operated in the simplest, most fool-proof and practical manner. Thus, it is my desire to eliminate all unnecessary mechanisms and apparatus. I prefer to use in the chamber 20, an oxygen supply tank 44 to maintain the proper atmospheric conditions within the tank 20 without any undue pressure for a sufficient length of time to maintain the life of those who may pass into this chamber from a submerged vessel, until such time as they may be rescued when the apparatus is raised above the surface of the body of water. It will also be understood that other supplies may be stored in the chamber 20 and including food, first aid kits and the like, as these may be found necessary in the use of apparatus of the class under consideration.

In the use of my improved apparatus, it will be understood that the covers 26 and 34 are in proper position as well as the cover 39 closing all external communications to the chamber 20, the gasket 21 is in proper position, and the turn buckles 22 are in raised position and the valve 31 is closed. The apparatus is now lowered into the water with preferably one but if desired two operators within the chamber 20, together with a diver in the usual or any preferred form of diving suit, the diver holding onto or otherwise descending with the apparatus and controlling the valve 31 to regulate the admission of water into the chamber 29 to aid in sinking the apparatus and to maintain as near as possible, the desired submerged buoyancy, facilitating the easy guiding of the apparatus, which is of course majorly controlled by means on the salvaging or other vessel.

When adjacent one of the flange bodies 7 of the submerged vessel, the diver guides the tubular projection 18 into the recess 8 of said flange body, and then lowers the turn buckles 22 one by one, and moves them into engagement with the flange 13, tightening said turn buckles sufficiently to retain the apparatus against displacement from the vessel. When all of the turn buckles have been properly positioned, they are drawn tightly in position to insure perfect sealing of the connection between the apparatus and the vessel, and a suitable tool may be used for this purpose, at which time, the diver signals to the operator or operators within the chamber 20 by tapping upon the hull of the apparatus or in any other desired manner, after which the cover 26 is removed by such operator and the water and pressure that may be contained within the chamber 19 will pass to some extent into the chamber 20, after which the valve 12, which is now accessible, is opened, to release the pressure between the chambers 19—20 and the chamber or compartment within the sunken vessel, after which the cover 9 is removed, and those within the compartment of the vessel may now pass into the chamber 20. Then, the cover 9 is again placed in position, the valve 12 closed, the cover 26 placed in position and the diver is signalled to detach or uncouple the apparatus from the vessel, and the turn buckles 22 returned to engagement with the spring clips 25.

Upon signal from the diver, the apparatus may be raised and those within the compartment 20 may pass out, by releasing either of the covers 26 or 34, it being understood that only one of these covers need absolutely be employed, but in the event of accident to anyone within the chamber 20, as a measure of safety, the cover 34 is employed to permit of the external access to the chamber 20.

It will be understood that the apparatus, including the chamber 20 thereof may be sufficiently large to receive the entire crew of a predetermined type of vessel; or on the other hand, the apparatus may be raised and lowered a number of times to rescue the entire crew. It will also be understood that my invention is not necessarily limited to the specific use herein described, nor am I necessarily limited to any of the structural details herein set out and various changes therein and modifications thereof may be made within the scope of the appended claims without departing from the spirit of my invention or sacrificing its advantages.

Having fully described my invention, what I claim as new and desire to secure by Letters Patent, is:—

1. A submergible apparatus for use in conjunction with vessels having a hatchway in the hull thereof and a flanged ring encircling the hatchway, comprising a large hollow body, an admission opening at the top thereof and a cover plate closing said opening, a reduced tubular extension projecting beyond the lower end of said body, the chamber in said extension normally opening outwardly through the lower end thereof, a closure plate at the top of said extension controlling the communication between said chamber and the interior of said body, securing devices for said plate in the interior of said body, and means movably supported externally of and adjacent the upper end of said extension for detachably engaging the flanged ring on the hull of the vessel in securely coupling the apparatus to the vessel.

2. A submergible apparatus for use in conjunction with vessels having a hatchway in the hull thereof and a flanged ring encircling the hatchway, comprising a large hollow body, an admission opening at the top thereof and a cover plate closing said opening, a reduced tubular extension projecting beyond the lower end of said body, the chamber in said extension normally opening outwardly through the lower end thereof a closure plate at the top of said extension controlling the communication between said chamber and the interior of said body, securing devices for said plate in the interior of said body, means movably supported externally of and adjacent the upper end of said extension for detachably engaging the flanged ring on the hull of the vessel in securely coupling the apparatus to the vessel, and said means comprising coupling hooks including turnbuckle portions.

3. A submergible apparatus for use in conjunction with vessels having a hatchway in the hull thereof and a flanged ring encircling the hatchway, comprising a large hollow body, a reduced tubular extension projecting beyond the lower end of said body, the chamber in said extension normally opening outwardly through the lower end thereof, a closure plate at the top of said extension controlling the communication between said chamber and the interior of said body, securing devices for said plate in the interior of said body, means movably supported externally of and adjacent the upper end of said extension for detachably engaging the flanged ring on the hull of the vessel in securely coupling the apparatus to the vessel, and said means comprising coupling hooks including turnbuckle portions, and means for detachably supporting the free ends of said coupling hooks in connection with the bottom of said body outwardly of said extension.

4. A submergible apparatus for use in conjunction with vessels having a hatchway in the hull thereof and a flanged ring encircling the hatchway, comprising a large hollow body, a reduced tubular extension projecting beyond the lower end of said body, the chamber in said extension normally opening outwardly through the lower end thereof, a closure plate at the top of said extension controlling the communication between said chamber and the interior of said body, securing devices for said plate in the interior of said body, means movably supported externally of said extension for detachably engaging the flanged ring on the hull of the vessel in securely coupling the apparatus to the vessel, a ballast chamber arranged circumferentially of the lower end portion of said hollow body, and a valve operated externally of said body for controlling the admission of water into said ballast chamber.

In testimony that I claim the foregoing as my invention I have signed my name this 30th day of April, 1928.

HUGH J. FINN.